United States Patent
Chu et al.

(10) Patent No.: US 7,337,436 B2
(45) Date of Patent: Feb. 26, 2008

(54) SYSTEM AND METHOD FOR CROSS PLATFORM AND CONFIGURATION BUILD SYSTEM

(75) Inventors: Singyun Brian Chu, Mountain View, CA (US); Todd M. Kennedy, San Jose, CA (US); Teck Yang Lee, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 683 days.

(21) Appl. No.: 10/458,019

(22) Filed: Jun. 9, 2003

(65) Prior Publication Data

US 2004/0158577 A1 Aug. 12, 2004

Related U.S. Application Data

(60) Provisional application No. 60/445,763, filed on Feb. 7, 2003.

(51) Int. Cl.
*G06F 9/45* (2006.01)
(52) U.S. Cl. ..................................................... 717/140
(58) Field of Classification Search ................ 717/101, 717/121, 106, 107, 140
See application file for complete search history.

(56) References Cited

U.S. PATENT DOCUMENTS

2002/0147963 A1* 10/2002 Lee ............................ 717/108
2002/0184610 A1* 12/2002 Chong et al. ................ 717/109
2003/0188036 A1* 10/2003 Chen et al. .................. 709/310

OTHER PUBLICATIONS

Richard Monson-Haefel, "Enterprise JavaBeans, 2nd Edition", Mar. 2000, O'Reilly, 1-56592-869-5, excerpts.*
Partial European Search Report.
Borland Software Corporation, "Borland JBuilder 8: Building Applications with JBuilder", Internet Article http://info.borland.com/techpubs/jbuilder/jbuilder8/index1280×1024-ent.html, Nov. 5, 2002.
Borland Software Corporation, "Borland Releases Major Update of Number One Development Solution for Java", Internet Article http://www.borland.com/news/press_releases/2002/11_5_02_jb8_launch.html, Nov. 5, 2002.
Borland Software Corporation, "Borland JBuilder 8: Enterprise JavaBeans Developer's Guide", Internet Article http://info.borland.com/techpubs/jbuilder/jbuilder8/index1280×1024-ent.html, Nov. 5, 2002.

* cited by examiner

*Primary Examiner*—Wei Zhen
(74) *Attorney, Agent, or Firm*—Martine Penilla & Gencarella, LLP

(57) ABSTRACT

A system for building and managing a modular application includes multiple libraries. Each one of the libraries includes at least one functional module. The build system also includes a selector capable of selecting a functional module from the libraries. A compiler for compiling the selected functional module is also included.

11 Claims, 7 Drawing Sheets

SYSTEM AND METHOD FOR CROSS PLATFORM AND CONFIGURATION BUILD SYSTEM

CROSS REFERENCE TO RELATED APPLICATIONS

This application claims priority from U.S. Provisional Patent Application No. 60/445,763, filed on Feb. 7, 2003 and entitled "Modularization of Wireless Device Code Components and Custom Design Integration of JAVA™ and Non-JAVA™ Code Components" by Lee et al., which is incorporated herein by reference in its entirety.

BACKGROUND OF THE INVENTION

1. Field of the Invention

The present invention relates generally to mobile devices, and more particularly, to methods and systems for developing software applications for mobile computing devices.

2. Description of the Related Art

Mobile computing devices have become very widely used. There are many different types of mobile device platforms (e.g., cellular telephones and personal digital assistants (PDAs)). Each of the different types of mobile device platforms typically has a different hardware and a different operating system. By way of example, a first manufacturer may produce multiple cellular telephone models. Each of the multiple cellular telephone models can have a different hardware and different operating system. Further, a second manufacturer's PDA products use still different hardware and different operating system than is included in the first manufacturer's cellular telephone products.

As a result applications for the different types of device platforms are typically individually developed for each device platform. Unfortunately, if an application that was developed for a first device platform is desired to be used on a second device platform, the application must typically be redesigned, developed, and qualified. Redesigning, developing and qualifying each application for each mobile device platform is very labor intensive. As a result, an application developed for a first mobile device platform cannot be easily and directly deployed (i.e., ported) to a second mobile device platform.

By way of example, a first cellular telephone manufacturer develops an ingenious and very popular interactive entertainment application (i.e., a game) for their cellular telephone. The game helps increase sales of the first manufacturer's cellular telephones that include the game. As the cellular telephone industry is very competitive, a second cellular telephone manufacturer immediately takes notice of the game and desires to have the game deployed on their cellular telephone and personal digital assistant (PDA) product lines. Much to the dismay of the second manufacturer, the game must be substantially redesigned for each of their mobile platforms because their mobile device platforms are different than the first manufacturer's products.

One approach to resolving the issue of application portability across multiple device platforms is to adopt a standard device platform for all manufacturers and products. Unfortunately, no such standard has been adopted by all the mobile device platform manufacturers. Such a standard is not likely to be adopted any time soon due to the rapid development of the mobile device capabilities. Further, each of the numerous mobile device platform manufacturers has their own product capabilities, priorities, goals and economic factors that are very diverse.

In view of the foregoing, there is a need for as system and method of developing applications that are more easily ported across multiple device platforms. Additionally, there is a need for a system and method for more easily porting applications from a first target platform to a second target platform.

SUMMARY OF THE INVENTION

Broadly speaking, the present invention fills these needs by providing a system and method for developing, documenting and porting applications for multiple mobile computing devices. It should be appreciated that the present invention can be implemented in numerous ways, including as a process, an apparatus, a system, computer readable media, or a device. Several inventive embodiments of the present invention are described below.

One embodiment provides a build system. The build system includes multiple libraries. Each one of the libraries includes at least one functional module. The build system also includes a selector capable of selecting a functional module from the libraries. A compiler for compiling the selected functional module is also included.

The libraries can be sorted by functionality. Each one of the functional modules includes a corresponding description file. The description file includes a description of a function of the corresponding functional module. The description file can also identify a target platform that the corresponding functional module is compatible with.

The build system can also include an editor. The editor is capable of editing an existing functional module and capable of creating a new functional module. The capability of editing an existing functional module includes the capability of modifying a corresponding description file for the existing functional module.

The build system can also include a JAVA™ virtual machine. The at least one functional module can include a JAVA™ functional module. The at least one functional module can include a native code functional module.

Another embodiment includes a method of assembling an application in a build system. The method includes determining each of multiple desired functions includes determining a desired function and selecting one of a first set functional modules. Each one of the first set of functional modules provides the desired function. The set of desired functions are compiled.

Determining the desired function can include determining if the desired function can be performed by one of the first set of functional modules. If the desired function cannot be performed by one of the first plurality of functional modules, then a new functional module is created.

Another embodiment provides a method for porting a modular application from a first target platform to a second target platform. The method includes selecting a functional module from the code for the first target platform. The selected functional module is examined to determine if it is compatible with the second target platform. The selected functional module is added to a second set of functional modules if the selected functional module is compatible with the second target platform. The code for the first target platform is examined to determine if additional functional modules from the code for the first target platform must be examined. The second set of functional modules is compiled if no additional functional module from the code for the first target platform must be examined. The compiled code is output.

If the selected functional module is not compatible with the second target platform, then a corresponding library of the selected functional module is identified. The corresponding library is examined to determine if a sibling functional module that is compatible with the second target platform is included in the corresponding library. The sibling functional module is added to the second set of functional modules if the sibling functional module is compatible with the second target platform.

If a sibling functional module that is compatible with the second target platform is not included in the corresponding library then a new sibling functional module that is compatible with the second target platform is created. The new sibling functional module is added to the second set of functional modules.

At least one of the second set of functional modules is a JAVA™ module. At least one of the second set of functional modules is a native module.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Figure 1A:
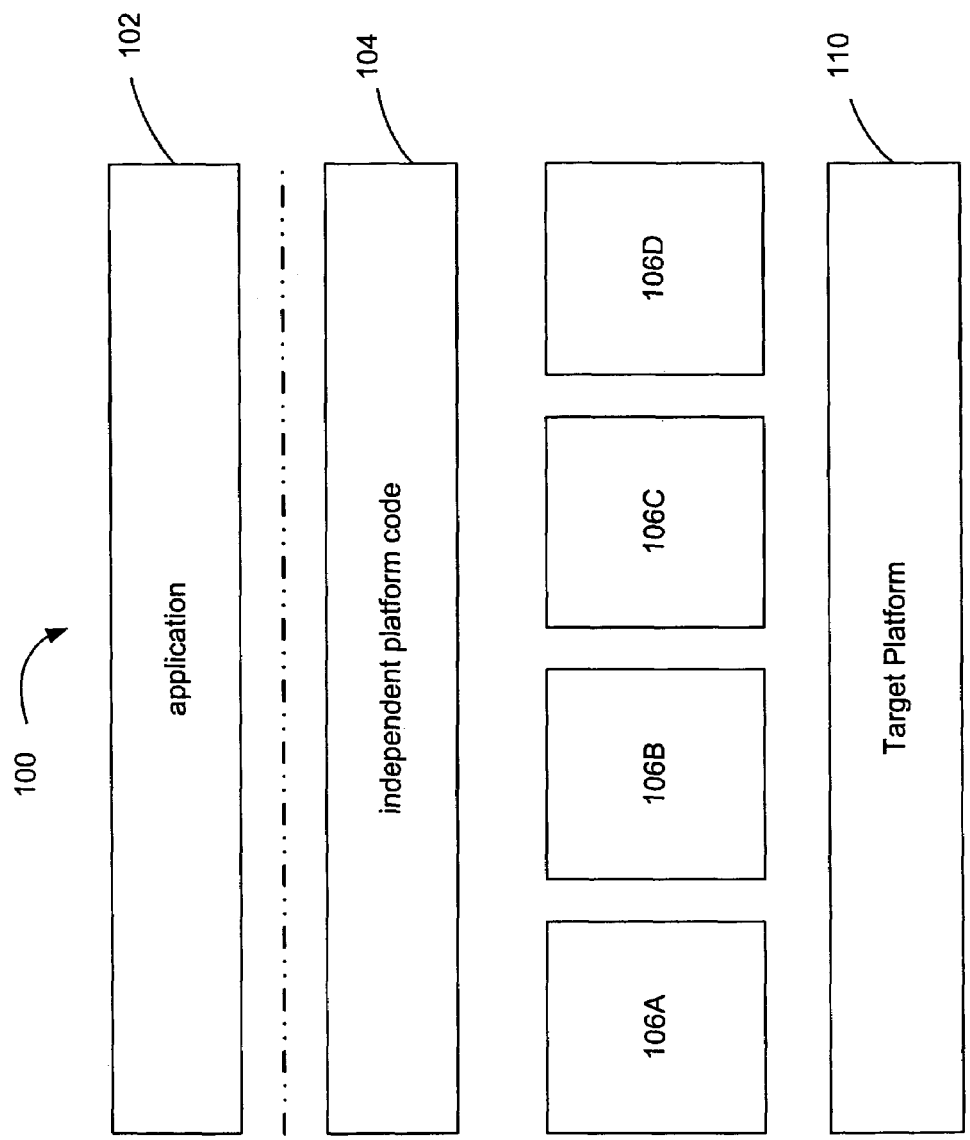
FIG. 1A is an exemplary modular architecture capable of supporting multiple implementations in accordance with one embodiment of the present invention.

Several exemplary embodiments for modularized software applications for mobile devices will now be described. It will be apparent to those skilled in the art that the present invention may be practiced without some or all of the specific details set forth herein.

As described above, mobile device platforms are very diverse and applications cannot easily be ported from a first mobile device platform to a second mobile device platform. One embodiment of the present invention exploits the application portability enabled by JAVA™. Another embodiment combines both native type applications and JAVA™ applications in a modular design to enable easily combined sets of applications. Another embodiment includes a system and method for assembling, documenting, archiving, and developing libraries of functional modules that can be combined to form modular applications that are easily ported between multiple target platforms.

Environment Description

As embodiments of the present invention can implement the J2EE, J2ME, or Enterprise JavaBeans (EJB) application, a brief introduction to J2ME, J2EE, and EJB architectures are provided below. The Java 2, Micro Edition (J2ME) platform is a JAVA™ platform for consumer and embedded devices such as mobile phones, Personal Digital Assistants (PDAs), TV set-top boxes, in-vehicle telematics systems, and a broad range of embedded devices. Similar to the enterprise (J2EE), desktop (J2SE™) and smart card (Java Card™) counterparts, the J2ME platform is a set of standard JAVA™ application program interfaces (APIs) defined through the Java Community Process$^{SM}$ program by expert groups that include leading device manufacturers, software vendors and service providers.

The J2ME platform delivers the power and benefits of JAVA™ technology tailored for consumer and embedded devices. The J2ME provides a flexible user interface, robust security model, broad range of built-in network protocols, and support for networked and disconnected applications. J2ME applications are written for a wide range of devices. As such, the J2ME applications can be downloaded dynamically and leverage each native capability of each device. The J2ME platform can be deployed on millions of devices (e.g., mobile phones, PDAs, automotive devices, etc.) supported by leading JAVA™ technology tools vendors and used by companies worldwide. Briefly stated, J2ME is the preferable platform for consumer and embedded devices.

The SDK provides software programmers with the speed, security and functionality to create cross-platform, mission critical applications. The JRE provides the execution environment needed to run JAVA™ platform-based applets and applications.

The J2ME architecture defines configurations, profiles and optional packages as elements for building complete JAVA™ runtime environments that meet the requirements for a broad range of devices and target markets. Each combination is optimized for the memory, processing power, and I/O capabilities of a related category of devices. The result is a common JAVA™ platform that fully leverages each type of device to deliver a rich user experience.

Configurations are composed of a virtual machine and a minimal set of class libraries. The configurations provide the base functionality for a particular range of devices that share similar characteristics (e.g., network connectivity, memory footprint, etc.). Currently, there are two J2ME configurations: the Connected Limited Device Configuration (CLDC), and the Connected Device Configuration (CDC).

The CLDC is the smaller of the two configurations, and by way of example, is designed for devices with intermittent network connections, slow processors, and limited memory (e.g., mobile phones, two-way pagers, PDAs, etc.). By way of example, the devices may have either 16- or 32-bit CPUs, and a minimum of 128 KB to 512 KB of memory available for the JAVA™ platform implementation and the associated applications.

The CDC is designed for devices having more memory, faster processors, and greater network bandwidth (e.g., TV set-top boxes, residential gateways, in-vehicle telematics systems, high-end PDAs, etc.). CDC includes a full-featured JAVA™ virtual machine, and a much larger subset of the J2SE platform than CLDC. As a result, most CDC-targeted devices have 32-bit CPUs and a minimum of 2 MB of memory available for the JAVA™ platform and associated applications.

In order to provide a complete runtime environment targeted at specific device categories, configurations can be combined with a set of higher level APIs or profiles that further define the application life cycle model, the user interface, and access to device specific properties.

A Mobile Information Device Profile (MIDP) is designed for mobile phones and entry-level PDAs. Broadly speaking, MIDP can be used on any computing device that needs to take advantage of MIDP's functions. MIDP is a set of JAVA™ APIs which, together with CLDC, provides a complete J2ME application runtime environment targeted at mobile information devices, such as mobile phones and entry level PDAs. In this manner, MIDP offers the core application functionality required by mobile applications (e.g., the user interface, network connectivity, local data storage, and application management, etc.). Combined with CLDC, MIDP provides a substantially complete JAVA™ runtime environment that leverages the capabilities of handheld devices and minimizes both memory and power consumption.

Currently, CLDC, combined with the MIDP is the JAVA™ runtime environment for mobile information devices (MIDs) (e.g., phones, entry level PDAs, etc.). MIDP provides the core application functionality required by mobile applications (e.g., the user interface, network connectivity, local data storage, and application lifecycle management packaged as a standardized JAVA™ runtime environment and set of JAVA™ APIs, etc.).

CDC profiles are layered so that profiles can be added as needed to provide application functionality for different types of devices. The Foundation Profile (FP) is the lowest level profile for CDC and provides a network-capable implementation of CDC that can be used for deeply embedded implementations without a user interface. FP can also be combined with Personal Basis Profile and Personal Profile for devices that require a graphical user interface (GUI). A Personal Profile (PP) is the CDC profile aimed at devices requiring full GUI or Internet applet support (e.g., high-end PDAs, communicator-type devices, game consoles, etc.). PP includes the full JAVA™ Abstract Window Toolkit (AWT) libraries and offers Web fidelity capable of easily running Web-based applets designed for use in a desktop environment. PP replaces PersonalJava™ technology and provides PersonalJava applications a clear migration path to the J2ME platform.

A Personal Basis Profile (PBP), is a subset of PP. PBP provides an application environment for network connected devices that support a basic level of graphical presentation or require the use of specialized graphical toolkits for specific applications. Devices (e.g., TV set-top boxes, in-vehicle telematics systems, information kiosks, etc.) Both PP and PBP are layered on top of CDC and FP.

The J2ME platform can be further extended by combining various optional packages with CLDC, CDC, and their corresponding profiles. In this manner, specific market requirements can be addressed. Furthermore, optional packages can offer standard APIs for using both existing and emerging technologies (e.g., Bluetooth, Web services, wireless messaging, multimedia, database connectivity, etc.). As optional packages are modular, device manufacturers can include the optional packages, as needed, to fully leverage the features of each device.

By way of example, J2ME™ Mobile Media API Reference Implementation Version 1.0 (MMAPI) extends the functionality of the J2ME platform by providing audio, video and other time-based multimedia support to resource-constrained devices. MMAPI allows JAVA™ developers to gain access native multimedia services available on a given device.

The reference implementation for MMAPI runs on the CLDC/MIDP profile running on Windows 2000. By way of example, the reference implementation for MMAPI has support for simple tone generation, tone sequencing, audio/video file playback and streaming, interactive MIDI, and audio/video capture. The J2ME MMAPI reference implementation is a source code product provided for porting to various platforms. The MMAPI specification has been developed through the JAVA™ Community Process$^{SM}$ (i.e., JSR-135) by an expert group composed of companies representing device manufacturers, wireless operators and software vendors.

As the embodiments of the present invention can also involve using Enterprise Java Beans (EJB)™ in J2EE platform, below are brief descriptions to the J2EE platform and EJBs. The JAVA™ 2 Enterprise Edition (J2EE™), developed by Sun Microsystems, Inc., is the development and deployment environment for enterprise software applications capable of running on a variety of desktop computers, servers, and other computing devices. J2EE provides architecture for developing, deploying, and executing applications in a distributed-object environment. In one embodiment, the J2EE platform comprises the JAVA™ 2 Software Development Kit, Standard Edition (SDK), and JAVA™ Runtime Environment (JRE).

J2EE facilitates building Web-based applications. Broadly speaking, J2EE services are performed in the middle tier between the user browser and the databases and legacy information systems. J2EE comprises a specification, reference implementation and a set of testing suites. J2EE further comprises Enterprise JavaBeans (EJB), JavaServer Pages (JSP), JAVA™ servlets, and a plurality of interfaces for linking to information resources in the platform.

The J2EE specifications define how applications should be written for the J2EE environment. Thus the specifications provide the contract between the applications and the J2EE platform. However, there exist a class of JAVA™ applications that require customization of the J2EE platform. These applications generally utilize application specific strategies created by a particular vendor to accomplish specific tasks that are not provided by the general JAVA™ platform on which the application executes. Examples of this class of JAVA™ applications include telecommunications applications and services that are deployed within a particular service provider's environment. This class of applications typically requires continuous availability, which means the environment in which the applications operate requires the applications to be available most of the time.

Summarily, EJB architecture promotes the creation of re-usable server-side behaviors or instructions in the JAVA™ language, connectors to enable access to existing enterprise systems, and easy-to-deploy program modules. The EJB architecture creates a collaborative architecture to provide services virtually anywhere, and for a wide range of customers and devices, including mobile devices.

The EJB architecture defines a model for the development and deployment of reusable JAVA™ server components called EJB components (i.e., EJB beans). As designed, the EJB component is a non-visible server component having methods that provide business logic in a distributed application. In one example, the EJB architecture includes the EJB client and the EJB server. The EJB client is configured to provide the user-interface logic on a client machine and to make calls to remote EJB components on a server. For instance, the EJB client is provided the information as to how to find the EJB server and how to interact with the EJB components.

In one example, the EJB client does not communicate directly with the EJB component. In one aspect, the EJB container provides the client proxy objects that implement the home and remote interfaces of the component. In another instance, the remote interface is configured to define the business methods that can be called by the client. In another embodiment, the client is configured to invoke the methods resulting in the updating of the database. Thus, the EJB beans are reusable components that can be accessed by client programs. The application programmer codes the business logic into the EJBs and deploys them into a J2EE compliant server. In one example, the server complying with the J2EE specification provides the required system-level services, thus allowing the application programmer to concentrate on business logic.

The EJB server (i.e., the EJB application) includes an EJB container, which in one example provides the services required by the EJB component. For instance, the EJB container may be configured to include one of an EJB home interface or EJB Remote interface and EJB beans. In one embodiment, the EJB home interface and the EJB remote interface are defined in the same JAVA™ virtual machine. In a different embodiment, the EJB home interface and the EJB remote interface may be defined on different JAVA™ virtual machines or separate physical computers.

In one example, the EJB specification defines a container as the environment in which one or more EJB components can be executed. In accordance to one example, the EJB container provides the infrastructure required to run distributed components thus allowing the clients and component developers to focus on programming business logic. Simply stated, the container manages the low-level communications between the clients and the EJB beans. In one example, once an EJB bean is created by a client, the client invokes methods on the EJB bean as if the EJB bean were running in the same virtual machine as the client.

Furthermore, the clients are unaware of activities on the EJB bean, since the container is configured to sit between the clients and the EJB beans. For instance, if an EJB bean is passivated, its remote reference on the client remains intact. Thus, when the client later invokes a method on the remote reference, the container activates the EJB bean to service the request.

The EJB container encapsulates the client runtime and generated sub classes. In one example, this allows the client to execute components on a remote server as if the components were local objects. The EJB container also encapsulates the naming service allows the clients to instantiate components by name. It further allows components to obtain resources (e.g., database connections, etc.) by name. The EJB server component dispatcher, which in one example, executes the component's implementation class and provides services such as transaction management, database connection pooling, and instance lifecycle management.

In one example, three types of EJB components can be enumerated. Stateful session Beans can manage complex processes or tasks that require the accumulation of data. They further manage tasks that require more than one method call to complete but are relatively short lived, store session state information in class instance data, and have an affinity between each instance and one client from the time the client creates the instance until it is destroyed by the client or by the server.

A stateless session bean manages tasks that do not require the keeping of client session data between method calls. Furthermore, the method invocation by a stateless session bean does not depend on data stored by previous method invocations, there is no affinity between a component instance and a particular client, and different instances of the stateless session beans are seemed identical to the client.

An entity bean model is a business model that is a real-world object which methods are run on the server machine. When the entity bean method is called, the program's thread stops executing and control is passed to the server. When the method returns from the server, the local thread resumes executing. In one example, the entity beans have the following characteristics: Each instance represents a row in a persistent database relation (e.g., a table, view, etc.); and The bean has a primary key that corresponds to the database relation's key which is represented by a JAVA™ data type or class.

Each EJB component further has a transaction attribute configured to determine the manner the instances of the component participate in transactions. As designed, the EJB container provides services which can include transaction and persistence support to the EJB components. As to the transaction support, the EJB container is configured to support transactions. In one example, when the bean is deployed, the EJB container provides the necessary transaction support. In regard to the persistence support, the EJB container is configured to provide support for persistence of the EJB components, which in one embodiment, is defined as the capability of the EJB component to save and retrieve its state. In this manner, the EJB component does not have to be re-created with each use.

In one example, the EJB architecture is a three-tiered architecture in which the clients reside on the first tier, the application server and the components (i.e., EJB beans) reside on the second tier, and the databases reside on the same host as the EJB server. In accordance to one implementation, the EJB server executes methods on a component from the client or another component, retrieves data from databases, and performs other communications. The EJB server further handles the details of transactions, threads, security, database connections, and network communication. Summarily, the EJB clients request business-logic services from EJB beans running on the second-tier. The EJB beans then use the system services provided by the second-tier server to access data from existing systems in the third tier. The EJB beans apply the business rules to the data, and return the results to the clients in the first-tier.

In one example, the client contains the user interface. The business logic is configured to be separate from both the clients and the databases and resides in the same tier (i.e., second tier) as components that analyze data, perform computations, or retrieve information from data sources and processes.

As J2ME, J2EE, and EJBs use the JAVA™ programming language, in a like manner, an overview of JAVA™ is provided below. In operation, a user of a typical JAVA™ based system interacts with an application layer of a system generally written by a third party developer. The application layer generally provides the user interface for the system. A JAVA™ module is used to process commands received by the application layer. A JAVA™ virtual machine is used as an interpreter to provide portability to JAVA™ applications. In general, developers design JAVA™ applications as hardware independent software modules, which are executed JAVA™ virtual machines. The JAVA™ virtual machine layer is developed to operate in conjunction with the native operating system of a particular hardware, which represents the physical hardware on which the system operates or runs. In this manner, JAVA™ applications can be ported from one hardware device to another without requiring updating of the application code.

Unlike most programming languages, in which a program is compiled into machine-dependent, executable program code, JAVA™ classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, JAVA™ is a programming language designed to generate applications that can run on all hardware platforms, small, medium and large, without modification. Developed by Sun, JAVA™ has been promoted and geared heavily for the Web, both for public Web sites and Intranets. Generally, JAVA™ programs can be called from within HTML documents or launched standalone. When a JAVA™ program runs from a Web page, it is called a "JAVA™ applet," and when run on a Web server, the application is called a "servlet."

JAVA™ is an interpreted language. The source code of a JAVA™ program is compiled into an intermediate language called "byte code". The byte code is then converted (interpreted) into machine code at runtime. Upon finding a JAVA™ applet, the Web browser invokes a JAVA™ interpreter (JAVA™ Virtual Machine), which translates the byte code into machine code and runs it. Thus, JAVA™ programs are not dependent on any specific hardware and will run in any computer with the JAVA™ Virtual Machine software. On the server side, JAVA™ programs can also be compiled into machine language for faster performance. However a compiled JAVA™ program loses hardware independence as a result.

Optimized Applications

One embodiment of the present invention provides the capability to modularize applications for computing devices. The modularized applications can be high performance implementations enabled upon, for example, a JAVA™ ™ 2 Platform, Micro Edition (J2ME™ platform) stack from Sun Microsystems, Inc. as described above.

The modularized applications provide high performance, ease of portability, and flexibility of design. Improving performance of mobile devices is important as the computing power of mobile devices is merely a fraction of that available on desktop computers. Although the performance of the CPU on mobile devices is steadily improving, the disparity is expected to remain for the foreseeable future. Accordingly, a high performance implementation is beneficial in many aspects such as providing a highly responsive and highly interactive user experiences.

Portability is beneficial for fast deployment of applications on the broadest possible range of device platforms. The currently available mobile device platforms differ markedly in the mobile device processor architecture, system-level architecture, operating system, graphics capabilities (e.g., size, color, resolution), and multimedia characteristics. As such, currently, a generic mobile device platform capable of representing the mobile device space does not exist.

Flexibility enables, for example, cellular telephone handset manufacturers to tailor the respective features and functions of their products. Modularized applications thereby allow the manufacturers to easily and economically differentiate the manufacturers respective offerings.

In addition to being portable, modularized applications provide good performance. However, performance and portability are often in conflict. For instance, making computer software more portable often results in a making the software more complex and therefore cause device platform to process the application slower. In contrast, making an application perform better typically includes paring the software down so that it runs efficiently on the specifically intended mobile device platform resulting in a much less portable application.

One embodiment beneficially reconciles portability and improved performance by implementing a modular architecture capable of supporting multiple implementations within each functional area (e.g., storage, networking, user interface, etc.).

FIG. 1A is an exemplary modular architecture 100 capable of supporting multiple implementations in accordance with one embodiment of the present invention. An application layer 102 is supported by a layer of platform independent code 104. The platform independent code 104 is in turn supported by multiple functional modules 106A-D which then operate on the target platform 110.

By way of example, the application 102 can be an address book application. The platform independent layer 104 includes standard address book functions (filing, sorting, searching, user interface, etc.) that support the functionality of the address book 102. The functional modules 106A-D provide the target platform specific functions that the platform independent layer 104 needs to provide the functions to the address book application 102. Module 106A can be a user interface module and includes the ability of the platform independent layer 104 to user interface I/O functions and capabilities of the target platform. By way of example, the functional module 106A can define how the color display (not shown) of the target platform 110 can be used by the platform independent layer 104. Further, functional module 106B can provide access to the memory system (not shown) of the target platform 110.

In this manner, the application 102, and platform independent code 104 can be directly ported from the first target platform 110 to a second target platform. However, one or more of the functional modules 106A-D (e.g., 106B) may be swapped for another functional module 106B' that is optimized to efficiently utilize the memory system of the second target platform.

When porting the modularized functional blocks to a target platform, the module implementations that are optimized to the particular target hardware and operating system are ported while those module implementations that are not optimized to the particular target hardware and operating system are not ported.

The functional modules are bound at compile time. As a result run-time overhead is minimized. Furthermore, footprint overhead is also minimized as unused implementations of the same functional module in the source base have not been bound during compile time. In this manner, unused implementations of the same functional modules are not compiled and do not consume additional space (e.g., memory, processing) on the target device.

In addition to enhancing performance and portability, the modular approach also increases flexibility over prior art approaches. By way of example, a device manufacturer can select any of the features desired, as each feature is implemented as a respective functional module (or group of modules).

Figure 1B:
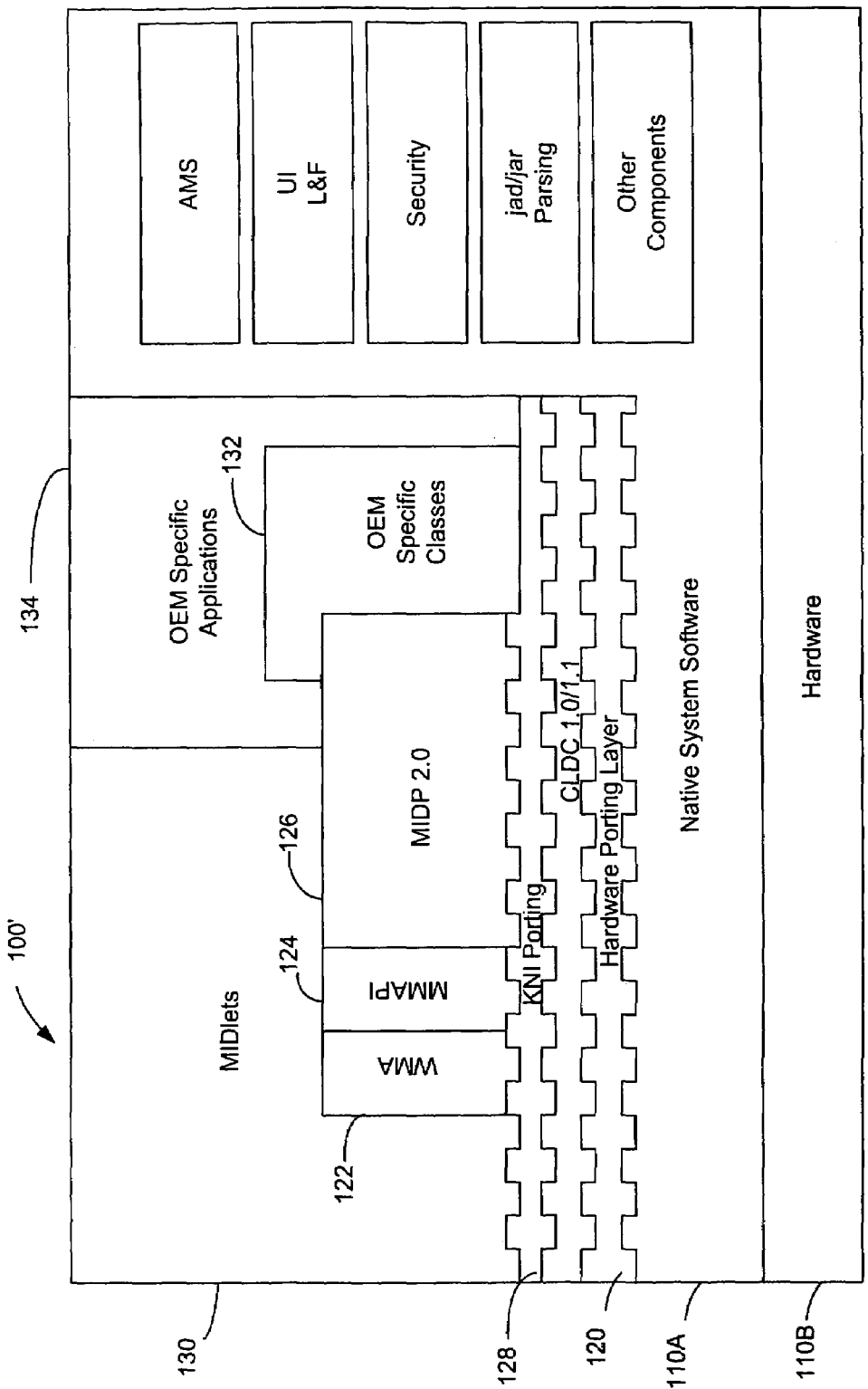
FIG. 1B is more detailed version of the modular architecture, in accordance with an embodiment of the present invention.

FIG. 1B is more detailed version of the modular architecture 100', in accordance with an embodiment of the present invention. As shown in FIG. 1B, the native system software 110A sits on top of native system hardware 110B. A CLDC layer 120 (HotSpot implementation CLDC 1.0/1.1 being recognized by the high performance of the CLDC) is shown on top of the native system software 110A. The WMA 122, MMAP 124, and MIDP 2.0 126 are also included and are configured to interact with the native system software 10A and hardware 110B using the KNI porting 128. The KNI porting 128 is a smaller implementation of the JNI and provides the native interface between the MIDP 126 and the CLDC 120. Also included are multiple applications (i.e., MIDlets 130), original equipment manufacturer (OEM) specific classes 132, OEM specific Applications 134. Additional components include, without limitations, to AMS 140, UI look and feel 142, security 144, JAD/JAR parsing 146, and other components 148. In one example, the components 130, 132, 134, 140, 142, 144, 146, 148 may be written in a native code (e.g., the C programming language) while the MIDP, MMAP, and WWA are written in JAVA™ programming language.

Shorter porting time is one of the benefits of the present invention. The modular structure is configured to reduce the amount of time required to port the latest JAVA™ technology to a target platform. In due course, this may become one of the leading benefits as the repository of functional modules (library of components) broadens over time to cover additional platforms. The functional modules can be reused for new target platforms having similar characteristics and capabilities.

Additionally, modularity facilitates future deployments by handset device manufacturers, individual components of devices can be replaced and updated while leaving the remaining parts of the platform unchanged. The present invention also provides high quality code that is easy to understand, integrate, and maintain. In this manner, software defects are minimized through internal testing and documentation. The improved, high quality code ultimately accelerates the development process and reduces deployment costs.

Modularity provides the manufacturers the opportunity to choose the features (e.g., J2ME platform optional packages) the manufacturers need or desire, thereby providing the manufacturers the flexibility to tailor the JAVA™ platform features. The manufacturers can beneficially use this flexibility to differentiate the manufacturers product offerings from the competition. In addition, the reduced port time provides a manufacturer additional time to design and develop other useful applications (e.g., MIDlets) to increase the value of the manufacturer's products.

The modular architecture is also scalable because unused functional modules are not included in the runtime. Restated, the modular architecture allows a manufacturer to minimize the footprint of the code that is required to perform the desired functions, thereby freeing resources to perform additional functions and features.

Figure 2:
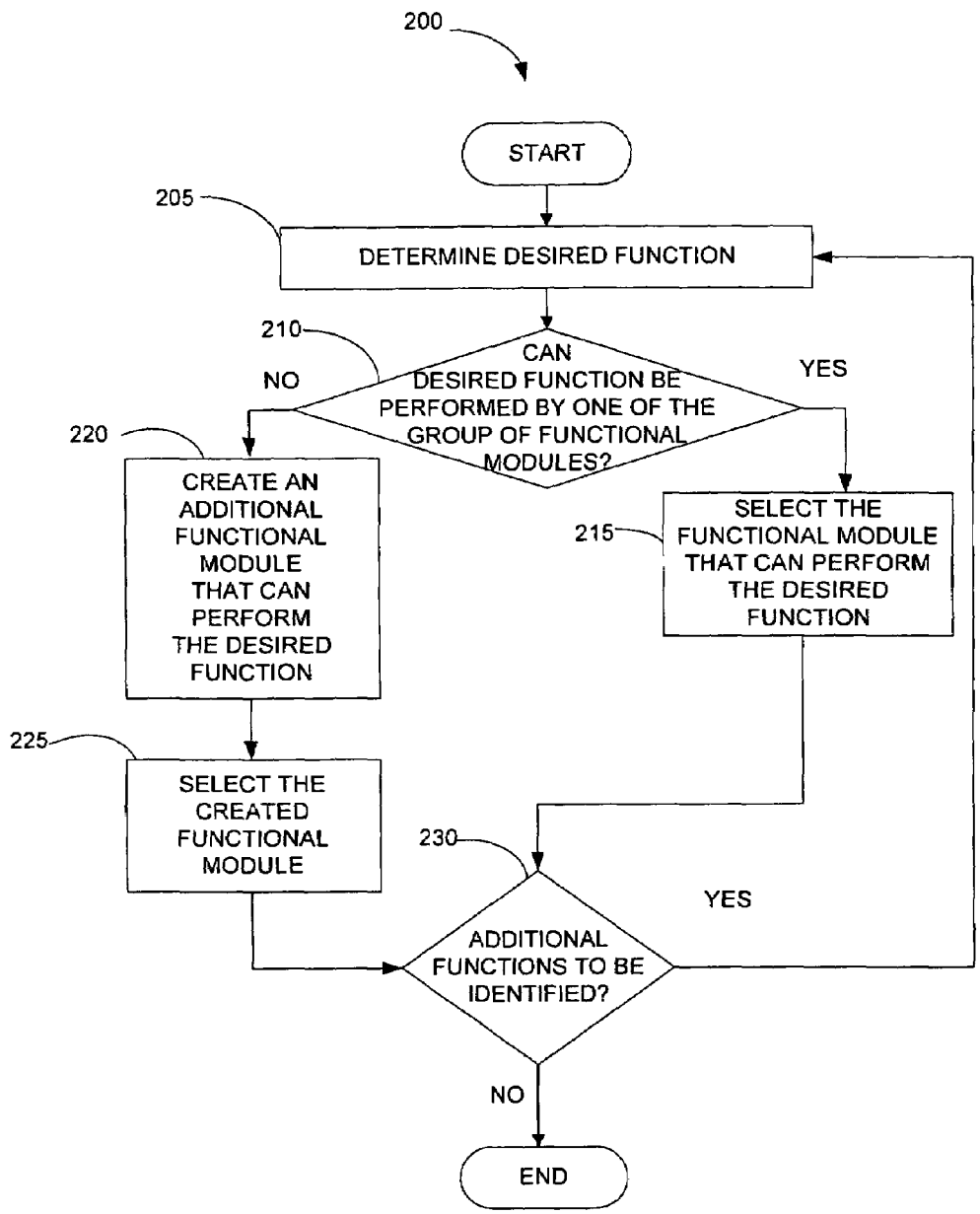
FIG. 2 is a flowchart of the method operations of creating a modularized application as described above.

FIG. 2 is a flowchart of the method operations 200 of creating a modularized application as described above. In operation 205, a desired function is determined. In operation 210, a group of functional modules are examined to determine if a functional module from the group of functional modules can perform the desired function. The group of functional modules can include JAVA™ modules or native code modules. Native code is defined as the language that is native to the particular target platform and can include C, C++ and as many other languages as there are different target platforms.

If a functional module that performs the desired function is available from the group, then the functional module can be selected in operation 215. The selected functional module will typically be selected based upon being optimized for the target platform hardware and/or operating system. However, it should be understood that the selected function module could be selected based upon the optimized result. By way of example, the selected functional module performs the desire function in a more desirable manner than other functional modules, where the other, non-selected, functional modules may more optimally utilize the resources of the target platform.

If, in operation 210 no functional module included in the group functional modules meets the desired requirements (e.g., desirable result, optimized for the target platform, etc.) then, in operation 220, an additional functional module is created. The additional function module can be optimized exploit at least one of the capabilities of the target platform or the desired result. The additional functional module can then be the selected functional module.

If in operation 225, additional functional modules are required to complete the functions of the application, then the method operations 205-225 are repeated to select the additional functional modules. Alternatively, if in operation 225, no additional functional modules are required, then the selected functional modules are compiled in operation 230. As a result of only compiling the selected functional modules, the resulting footprint of the code is minimized.

Figure 3:
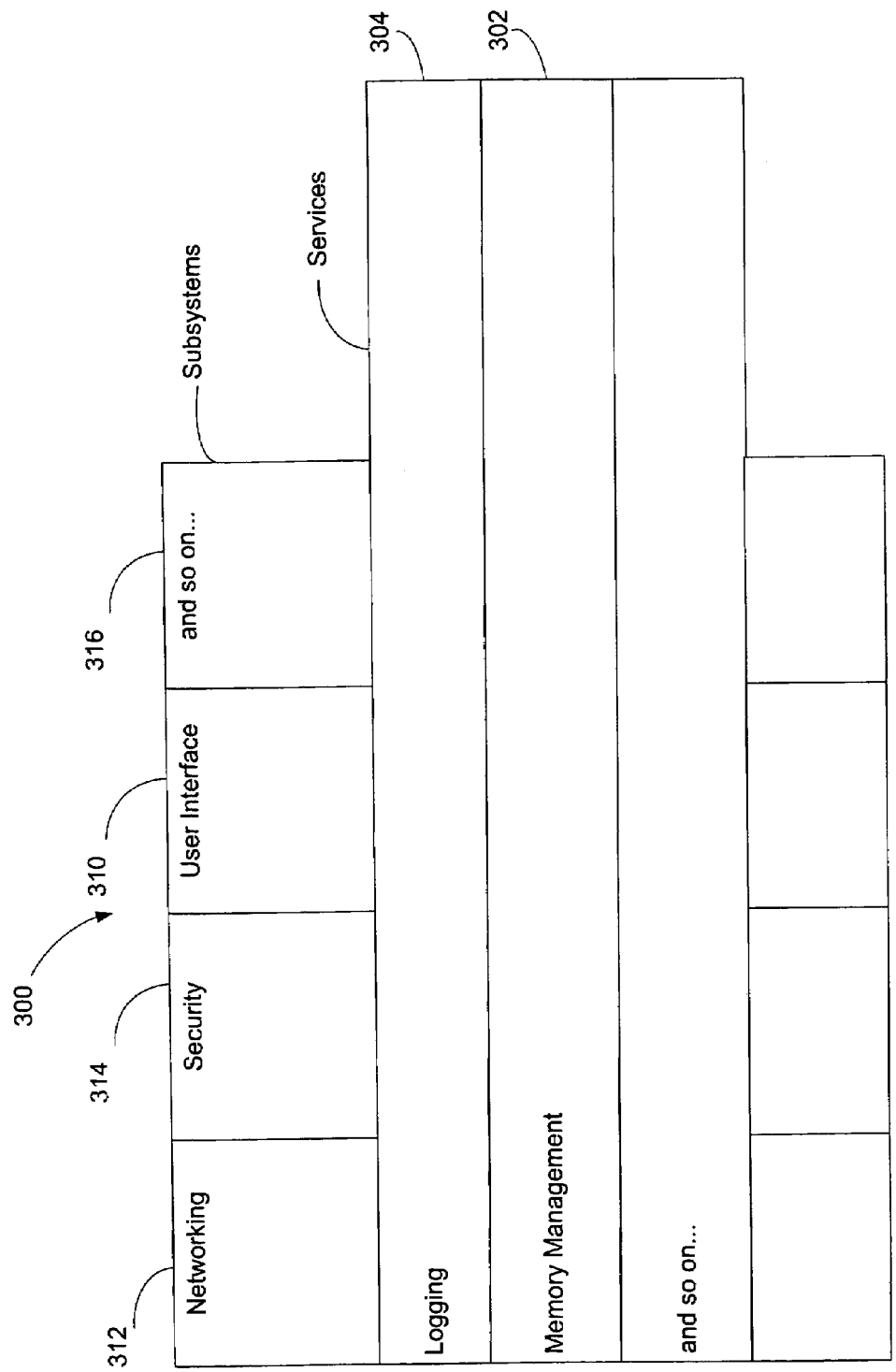
FIG. 3 illustrates an exemplary set of services and subsystems that may be deployed on a target platform, in accordance with one embodiment of the present invention.

FIG. 3 illustrates an exemplary set of services and subsystems 300 that may be deployed on a target platform, in accordance with one embodiment of the present invention. The modular architecture 100' can be used to implement the services and subsystems. Services provide functionality (e.g., logging, etc.) that subsystems use. Subsystems are high-level functional blocks (e.g., user interface, networking, etc.). There can be multiple implementations of a particular subsystem, with each implementation tailored to a particular type of device. The modularity of the present invention provides the flexibility to choose modules and respective optimal implementation for a target platform.

The services can include, for example:
Native memory management 302 for keeping native memory usage disciplined;
Logging functions 304 for debugging during development;
Profiling for identifying performance and resource bottlenecks during development;
Event management for handling system events (e.g., user interaction, networking, push events, I/O, etc.);
Persistent storage—for supporting MIDlet storage, RMS, persistent configuration information (e.g., MIDlet security settings, etc.) and so on;
Internationalization for localization to a target geographical market segment; and
Configuration for adapting to device requirements.

Subsystems can have different architectures to meet the high level requirements. Each subsystem may have a set of requirements as different devices can have different capabilities. By way of example, each subsystem can consist of One or more loosely coupled, interchangeable components, an architecture to tie the components together, one or more well-documented interfaces for communication between subsystems, one or more well-documented porting interfaces, multiple porting interfaces may also be required due to different requirements associated with various platforms. By way of example, RMS can be implemented instead of a POSIX file API or a native database API on a Windows CE platform. A choice of porting interface can accommodate and optimize performance on different platforms. One or more configurable, tunable features can also be included. In one embodiment, the following subsystems are included:

User interface (LCDUI) 310 High-level user interface components;
Networking 312;
Security 314; and
other subsystems 316 such as:
    Low-level user interface components; and
    Game API support;
    Serial I/O;
    Record Management System (RMS);
    Application Management System (AMS);
    Audio Building Block;
    Wireless Messaging API (WMA); and
    Mobile Media API (MMAPI).

Build System

Figure 4A:
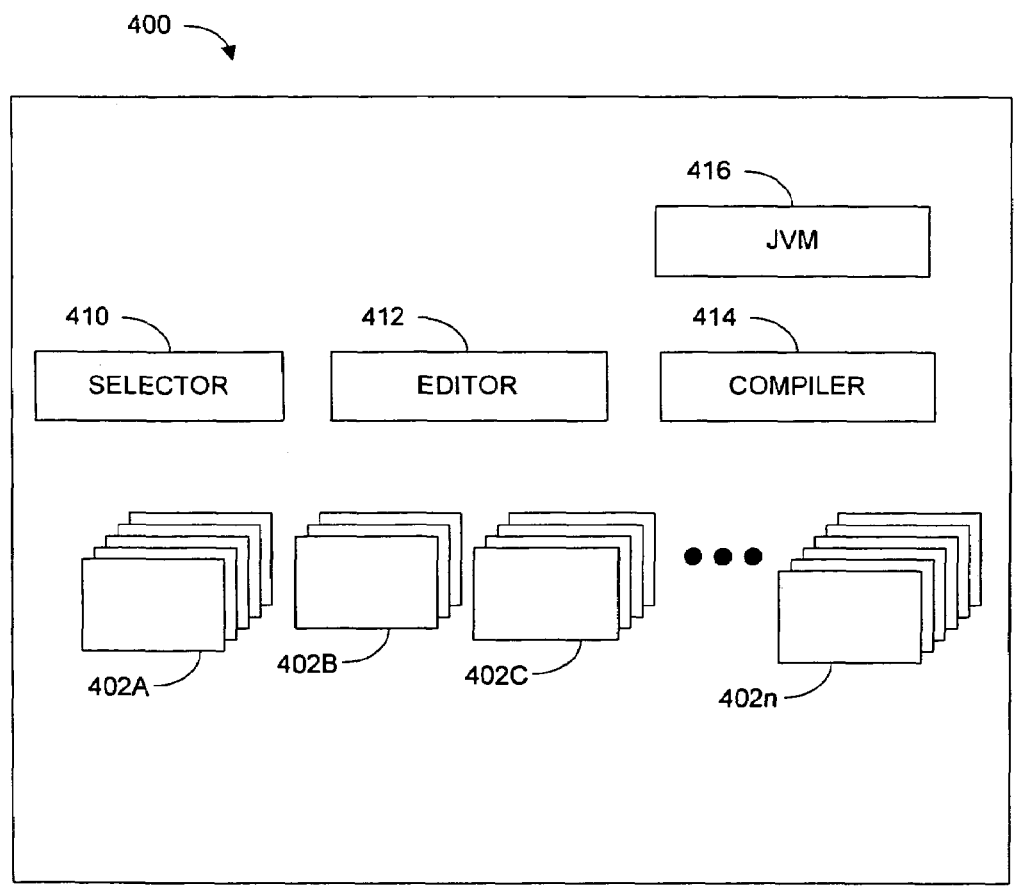
FIG. 4A is a block diagram of a build system, in accordance with one embodiment of the present invention.

Given the foreseeable libraries of functional modules that will be developed, a build system is needed to manage and manipulate the libraries of functional modules. FIG. 4A is a block diagram of a build system 400, in accordance with one embodiment of the present invention. The build system 400 includes multiple libraries 402A-402n of functional modules. A selector 410 provides the ability to select and sort and other accessing type manipulations of the multiple libraries 402A-402n. An editor 412 can also be included to provide the capability of modifying the functional modules contained within the multiple libraries 402A-402n or for creating new functional modules. The build system can also include a complier 414 for compiling the functional modules selected from the multiple libraries 402A-402n. The build system can also include a JAVA™ VM 416.

Figure 4B:
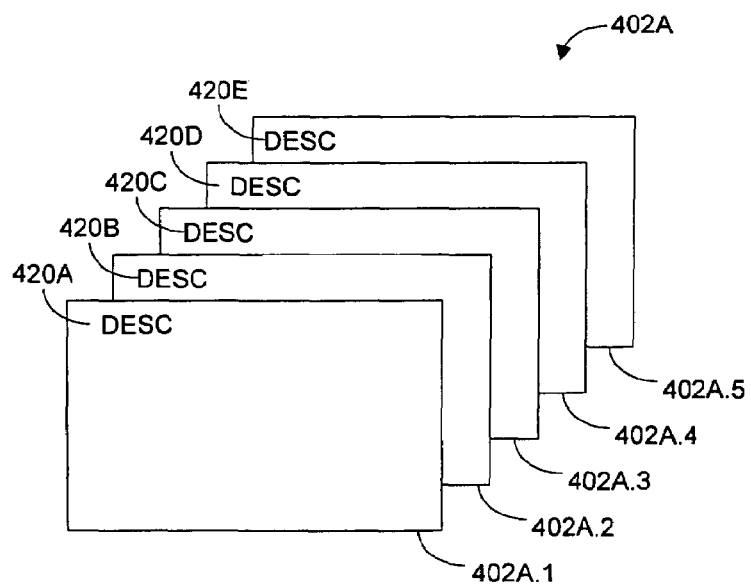
FIG. 4B is a detailed view of the library, in accordance with one embodiment of the present invention.

FIG. 4B is a detailed view of the library 402A, in accordance with one embodiment of the present invention. The library 402A includes functional modules 402A.1-402A.5. Each of the functional modules 402A.1-402A.5 includes a corresponding description file 420A-E. The description file 420A can include a name for the functional module 402A.1 and can also describe the capabilities (e.g., functional description) and the compatibilities (hardware and/or OS the functional module is compatible with and/or optimized for). The description file 420A can also include interdependencies and inter-workings with other functional modules. The functional modules 402A.1-402A.5 can be JAVA™ or other code based (i.e., native code).

Table 1 is an exemplary description file in accordance with one embodiment of the present invention.

TABLE 1 mmapi.config 1.1 03/05/12
\#
\# System properties for MMAPI.
\#
microedition.media.version: 1.1
supports.mixing: true
supports.audio.capture: true
supports.video.capture: false
supports.recording: true TABLE 1-continued audio.encodings: encoding=pcm
video.snapshot.encodings: encoding=jpeg
streamable.contents: audio/x-wav Table 2 is an exemplary configuration file for an application in accordance with one embodiment of the present invention

TABLE 2

```
<!-- ============= Leapfrog Configuration File =============== -->
This is a example of configuration file template for
Leapfrog building framework.
Depending on the workspace your are going to normalize
you can add as many target as they are provided in the
workspace build system (whether it's makefile or DOS
batch file).
%W% %D%
-->
<!-- ============= Workspace Definitions ================ -->
<!-- Each of Configuration file can have only one workspace -->
<workspace name="WMA" version="1.1" default="usage" basedir=".">
<!-- This is a demo configuration file for WMA workspace. -->
<description> WMA workspace </description>
<!-- WMA requires make to create the system -->
<build refid="make" executable="gnumake"/>
<!-- WMA can make doc release -->
<target name="build-doc" platform="win32">
<!-- This explains where should the execute command be run -->
<directory="${workspace.dir}/build/win32"/>
<!-- Execute the make command with doc as a option flag -->
<execute refid="make">
<option="doc"/>
</execute>
<!-- Copy the results from the doc release into a place
where Leapfrog Building Framework can locate them. OR
alternatively, this information can be used to generate
the dynamic configuration at the end. -->
<release src="${workspace.dir}/doc" kind="doc"/>
</target>
```

Figure 5:
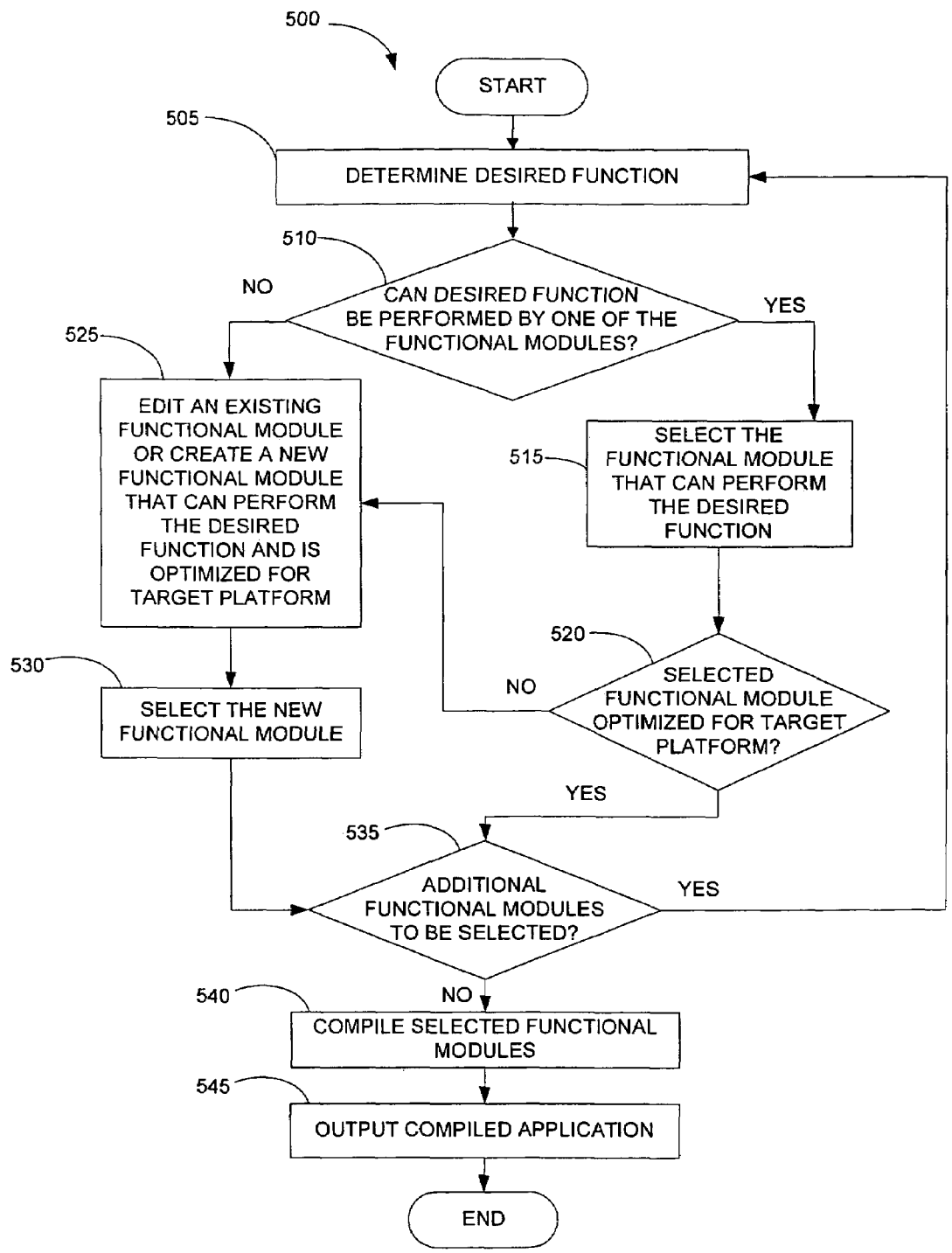
FIG. 5 is a flowchart diagram of the method operations for assembling an application for a target platform in accordance with one embodiment of the present invention.

FIG. 5 is a flowchart diagram of the method operations 500 for assembling an application for a target platform in accordance with one embodiment of the present invention. In an operation 505, the desired function is determined. In operation 510, a library of functional modules 402A are examined to determine if a functional module (functional module 402A.1) can perform the desired function. The corresponding description file 420A can be used to determine if the described function of the functional module matches the desired function.

If the functional module 420A can perform the desired function, then the functional module can be selected in operation 515. In operation 520, the selected functional module 420A is examined to determine if the functional module is compatible with and/or optimized for the target platform. If the functional module 420A is compatible with and/or optimized for the target platform, then the method operations continue in operation 535.

If, in operation 510 no functional modules included in the library 402A meets the desired requirements (e.g., desirable result, optimized for the target platform, etc.) then, in operation 525, a new functional module is created. The new functional module can be created by modifying an existing functional module (e.g., functional module 420C) or by any other method. The new functional module can be optimized exploit at least one of the capabilities of the target platform or the desired result. The new functional module can then be the selected functional module in operation 530.

If, in operation 520 above, the functional module 420A is not compatible with and/or optimized for the target platform, then the method operations continue in operation 525 described above.

If in operation 535, additional functional modules are required to complete the functions of the application, then the method operations 505-535 are repeated to select the additional functional modules. Alternatively, if in operation 535, no additional functional modules are required, then the selected functional modules are compiled in operation 540. As a result of only compiling the selected functional modules, the resulting footprint of the code is minimized.

In operation 545, the compiled code is output and the method operation end.

Typically application code for a target platform is developed by selecting the functional blocks as described above. If at a subsequent time, an additional function is desired to be added to the application code, then the source code was modified to add the desired functionality. In one embodiment, the application code can easily be modified to add the newly desired function. By way of example, if a target platform manufacturer desired to add WMA functionality to the target platform, then the code can be recreated and an appropriate WMA functional module can be added.

Further, because the functional modules are modular in design, then an updated functional module can be easily inserted to replace a previously inserted functional module. By way of example, if a first application included the functional module 420A and at a subsequent time, functional module 420E was developed and operated in a more desirable manner than functional module 420A, then, as described above the code can be recreated to replace functional module 420A with improved functional module 420E.

Figure 6:
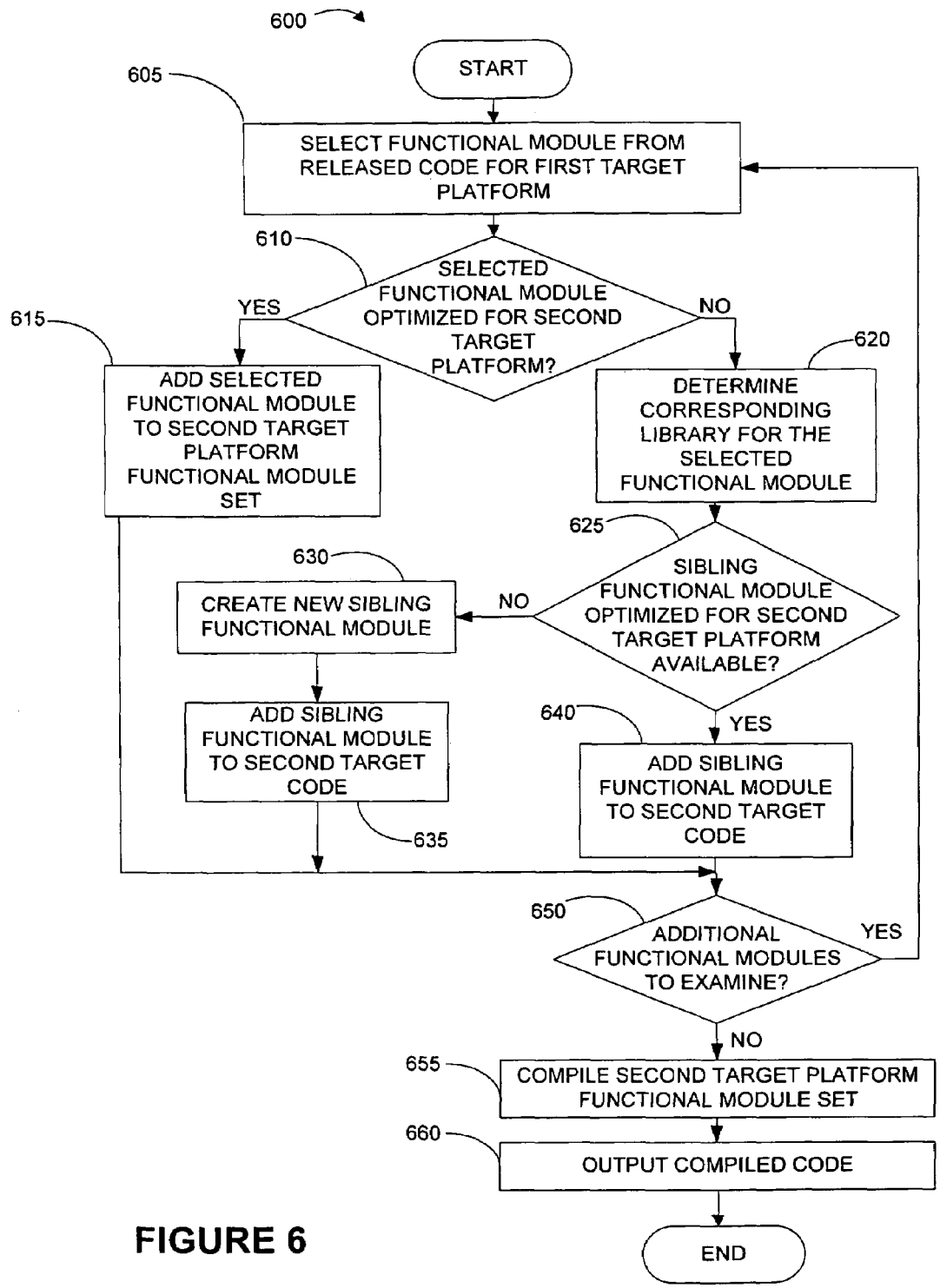
FIG. 6 is a flowchart diagram of the method operations for porting an application from a first target platform to a second target platform, in accordance with one embodiment of the present invention.

Once an application has been created as described above, for a first target platform, it may be desired to rapidly port that application to a second target platform. FIG. 6 is a flowchart diagram of the method operations 600 for porting an application from a first target platform to a second target platform, in accordance with one embodiment of the present invention. In an operation 605 a first functional module from the code for the first target platform is selected for examination. In operation 610, the selected functional module is examined to determine if the selected functional module is compatible with the second target platform. If the selected functional module is compatible with the second target platform, then the selected functional module is added to the second target platform set of functional modules in operation 615 and the method operations continue in operation 650.

If in operation 610, the selected functional module is not compatible with the second target platform, then in operation 620, the corresponding library that the selected functional module originated from is determined. In operation 625, the corresponding library is examined to determine if a sibling functional module having the same functionality but is compatible with/optimized for the second target platform is available. If such a sibling functional module is available, the sibling functional module is added to the second target platform set of functional modules in operation 640 and the method operations continue in operation 650.

If in operation 625, no such sibling functional module is available, then in operation 630, a new sibling functional module is created. In operation 635, the new sibling functional module is added to the second target platform set of functional modules and the method operations continue in operation 650.

In operation 650, the code for the first platform is examined to determine if any additional functional modules remain to be converted. If such additional functional modules remain to be converted then the method operations continue in operation 605. If no such additional functional modules remain to be converted then the method operations continue in operation 655.

In operation 655, the second target platform set of functional modules is complied. The compiled second target platform set of functional modules is output in operation 660.

Furthermore, although the present invention implements JAVA™ programming language, other programming languages may be used to implement certain embodiments and aspects of those embodiments of the present invention (e.g., C, $C_{++}$, any object oriented programming language, etc.). With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations. The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 2, 5 and 6 are not required to be performed in the order illustrated, and that all the processing represented by the operations may not be necessary to practice the invention. Further, the processes described in FIGS. 2, 5 and 6 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A build system comprising:
   a computer system including:

a plurality of libraries, each one of the plurality of libraries including at least one of a plurality of functional modules;

a selector capable of selecting a functional module from the plurality of functional modules, wherein a selected target platform includes a virtual machine, wherein the plurality of functional modules includes a functional module compatible at least one of the virtual machine and a native code of the selected target platform and wherein the selected functional module is compatible with at least one of the native code of the selected target platform and the virtual machine, wherein selecting the functional module from the plurality of functional modules includes sorting plurality of functional modules by functionality and wherein each one of the functional modules includes a corresponding description file including a description of one or more functions of the corresponding functional module and identifies a corresponding target platform that the corresponding functional module is compatible with, and wherein the plurality of functional modules further includes a sibling functional module that is compatible with a second target platform; and a compiler for compiling the selected functional module.

2. The system of claim 1, further comprising an editor, the editor capable of editing an existing one of the plurality of functional modules and capable of creating a new functional module.

3. The system of claim 2, wherein the capability of editing an existing one of the plurality of functional modules includes the capability of modifying a corresponding description file for the existing functional module.

4. The system of claim 1, wherein the virtual machine includes a JAVA™ virtual machine.

5. A method of assembling an application in a build system comprising:

determining a plurality of desired functions including:
determining a desired function; and
selecting one of a first plurality of functional modules, each one of the first plurality of functional modules provides the desired function, wherein each one of the first plurality of functional modules are included in at least one of a plurality of libraries, wherein a selected functional module is compatible with at least one of a native code of a selected target platform or a virtual machine included in the selected target platform, wherein the first plurality of functional modules includes a first functional module compatible with the virtual machine and a second functional module compatible with the native code of the selected target module, wherein selecting one of the functional modules from the plurality of functional modules includes sorting plurality of functional modules by functionality and wherein each one of the functional modules includes a corresponding description file including a description of one or more functions of the corresponding functional module and identifies a corresponding target platform that the corresponding functional module is compatible with, and wherein the plurality of functional modules further includes a sibling functional module that is compatible with a second target platform; and compiling the selected functional modules corresponding to the plurality of desired functions.

6. The method of claim 5, wherein determining the desired function includes determining if the desired function can be performed by one of the first plurality of functional modules.

7. The method of claim 6, wherein if the desired function can not be performed by one of the first plurality of functional modules, then a new functional module is created.

8. A method for porting a modular application from a first target platform to a second target platform comprising:

selecting a functional module from the code for the first target platform from a plurality of functional modules, wherein selecting the functional module from the plurality of functional modules includes sorting plurality of functional modules by functionality and wherein each one of the functional modules includes a corresponding description file including a description of one or more functions of the corresponding functional module and identifies a corresponding target platform that the corresponding functional module is compatible with;

determining if the selected functional module is compatible with at least one of a virtual machine included in the second target platform or a native code of the second target platform;

adding the selected functional module to a second plurality of functional modules if the selected functional module is compatible with at least one of the virtual machine included in the second target platform or the native code of the second target platform;

wherein if the selected functional module is not compatible with the second target platform, then:
identifying a corresponding library of the selected functional module;
determining if a sibling functional module that is compatible with the second target platform is included in the corresponding library; and
adding the sibling functional module that is compatible with the second target platform to the second plurality of functional modules, if the sibling functional module that is compatible with the second target platform is included in the corresponding library;

determining if an additional functional module from the code for the first target platform must be examined;

compiling the second plurality of functional modules if no additional functional module from the code for the first target platform must be examined; and outputting the compiled code.

9. The method of claim 8, wherein if a sibling functional module that is compatible with the second target platform is not included in the corresponding library then:

creating a new sibling functional module that is compatible with the second target platform; and adding the sibling functional module that is compatible with the second target platform to the second plurality of functional modules.

10. The method of claim 8, wherein the virtual machine is a JAVA™ virtual machine.

11. The method of claim 8, wherein at least one of the second plurality of functional modules is a native module.

* * * * *